United States Patent
Tokuyama et al.

(10) Patent No.: US 11,603,058 B2
(45) Date of Patent: Mar. 14, 2023

(54) VEHICLE

(71) Applicants: TOYOTA JIDOSHA KABUSHIKI KAISHA, Aichi (JP); SUBARU CORPORATION, Tokyo (JP)

(72) Inventors: Koji Tokuyama, Nishio (JP); Yoshihiro Itoh, Nisshin (JP); Dan Suzuki, Tokyo-to (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 33 days.

(21) Appl. No.: 17/148,571

(22) Filed: Jan. 14, 2021

(65) Prior Publication Data

US 2021/0237673 A1    Aug. 5, 2021

(30) Foreign Application Priority Data

Jan. 30, 2020  (JP) .............................. JP2020-013541

(51) Int. Cl.
  *B60R 19/52*  (2006.01)
  *B60K 11/08*  (2006.01)
  *B60Q 5/00*  (2006.01)
(52) U.S. Cl.
  CPC .............. *B60R 19/52* (2013.01); *B60K 11/08* (2013.01); *B60Q 5/00* (2013.01); *B60R 2019/525* (2013.01)
(58) Field of Classification Search
  CPC ... B60R 19/52; B60R 2019/525; B60K 11/08; B60Q 5/00

USPC ....................... 293/113, 117; 296/193.1, 208
See application file for complete search history.

(56) References Cited

U.S. PATENT DOCUMENTS

| | | | |
|---|---|---|---|
| 10,538,158 B2* | 1/2020 | Sedlak | ................. B60K 11/085 |
| 10,576,885 B2* | 3/2020 | Schmitt | ................... B60R 21/34 |
| 2001/0050160 A1* | 12/2001 | Ozawa | ................. B60Q 1/0433 |
| | | | 165/140 |
| 2009/0001736 A1* | 1/2009 | Makino | ..................... B60Q 5/00 |
| | | | 293/115 |
| 2016/0368364 A1* | 12/2016 | Aoki | ...................... B60K 11/08 |
| 2017/0050509 A1* | 2/2017 | Aizawa | ................ B60K 11/085 |
| 2018/0126841 A1* | 5/2018 | Vacca | ........................ F16C 1/02 |
| 2019/0176694 A1 | 6/2019 | Schmitt et al. | |

FOREIGN PATENT DOCUMENTS

| | | |
|---|---|---|
| JP | S5673950 U | 6/1981 |
| JP | H11321458 A | 11/1999 |
| JP | 2001121941 A | 5/2001 |
| JP | 2010163075 A | 7/2010 |
| JP | 201217036 A | 1/2012 |
| JP | 20178748 A | 1/2017 |
| JP | 2018127060 A | 8/2018 |

\* cited by examiner

*Primary Examiner* — D Glenn Dayoan
*Assistant Examiner* — E Turner Hicks
(74) *Attorney, Agent, or Firm* — Hauptman Ham, LLP

(57) ABSTRACT

A vehicle may include: a front grille including an air intake; a radiator arranged behind the front grille; an air duct configured to guide air from the air intake to the radiator, the air duct widening upward from the air intake to the radiator; and a horn arranged in front of the air duct at a position higher than the air intake.

5 Claims, 4 Drawing Sheets

VEHICLE

CROSS-REFERENCE TO RELATED APPLICATION

This application claims priority to Japanese Patent Application No. 2020-013541 filed on Jan. 30, 2020, the contents of which are hereby incorporated by reference into the present application.

TECHNICAL FIELD

The art disclosed herein relates to a vehicle including a horn at a front part of the vehicle. In particular, the art disclosed herein relates to an arrangement of the horn.

BACKGROUND

A vehicle includes a horn at a front part of its vehicle body (in a front compartment). For example, Japanese Patent Application Publication Nos. 2018-127060, 2010-163075, 2012-017036, 2017-008748, and H11-321458 each disclose a vehicle including a horn.

A horn may be arranged behind an air intake of a front grille such that a loud sound is emitted forward from a vehicle (e.g., Japanese Patent Application Publication Nos. 2018-127060, 2010-163075). In a vehicle including an air duct configured to guide air from an opening of a front grille to a radiator, a horn may be arranged such that a sound is emitted into the air duct (e.g., Japanese Patent Application Publication Nos. 2012-017036, 2017-008748). An anti-theft horn for a vehicle may be arranged in a fan shroud of a radiator (e.g., Japanese Patent Application Publication No. H11-321458).

SUMMARY

If required cooling performance of a radiator does not need to be high, an air intake of a front grille may be small. In this case, it is difficult to arrange a horn to be oriented to the air intake. Meanwhile, arranging a horn such that its sound is emitted into an air duct would make the air duct have a complicated shape. The disclosure herein provides a novel structure that enables a sound from a horn to be effectively emitted forward from a vehicle.

A vehicle disclosed herein may include an air duct configured to guide air from an air intake of a front grille to a radiator. The air duct may widen upward from the air intake of the front grille toward the radiator. A horn may be arranged in front of the air duct at a position higher than the air intake of the front grille. With the horn arranged in front of the air duct, the soft air duct serves as a sounding board such that a sound leaking rearward from the horn is reflected at the air duct and spreads out forward. Arranging the horn in front of the air duct allows a sound from the horn to be effectively emitted forward from the vehicle.

The horn may be arranged to overlap with an upper corner of the air duct when seen from a front of the vehicle, so as not to obstruct an air flow in the air duct. Alternatively, the horn may be arranged not to overlap with a fan of the radiator when seen from the front of the vehicle. The expression "when seen from a front of the vehicle" is synonymous with "in a front view of the vehicle".

Further, a recess may be provided at the upper corner of the air duct when seen from the front of the vehicle, and the horn may be arranged at the recess. The recess at the upper corner of the air duct does not affect the air flow much. Owing to the recess at the air duct, the horn can be arranged with high space efficiency.

The art disclosed herein is suitable especially for a vehicle in which an air intake of its front grille is located lower than the center of its radiator in height direction. Details and further developments of the art disclosed herein will be described in DETAILED DESCRIPTION as below.

DETAILED DESCRIPTION

Embodiment

Figure 1:
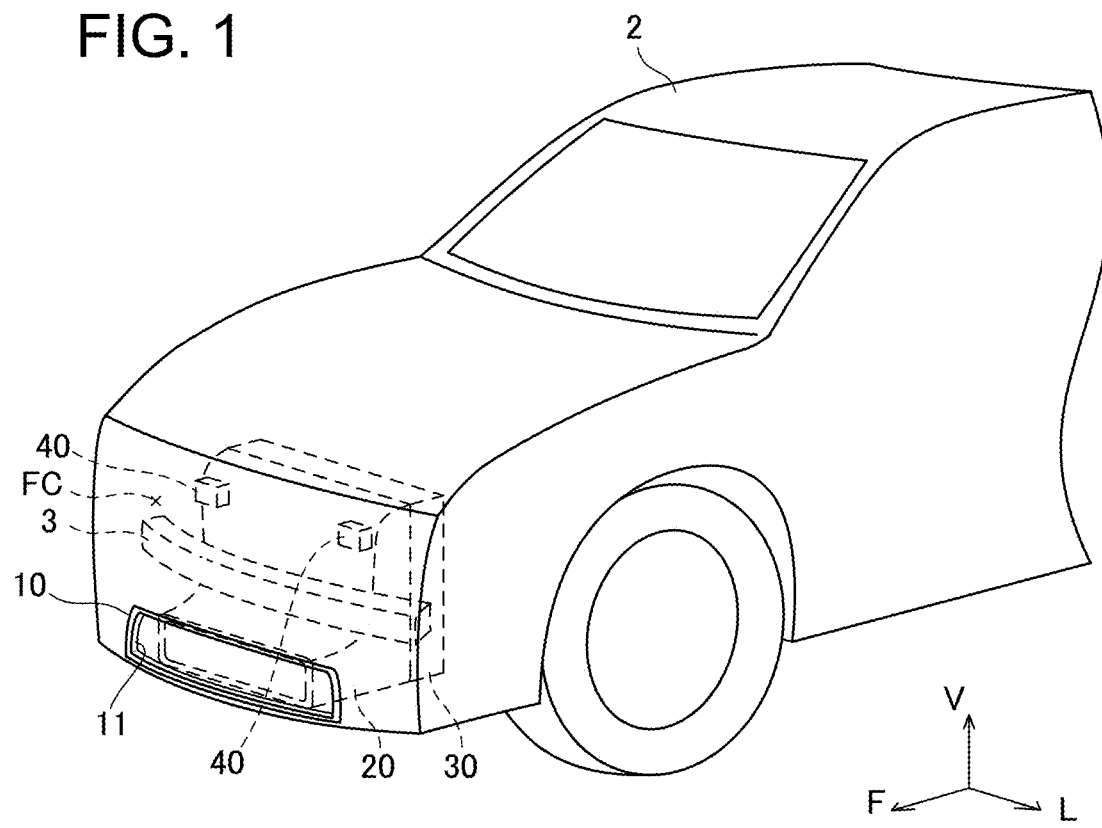
FIG. 1 is a perspective view of a vehicle according to an embodiment.
Figure 2:
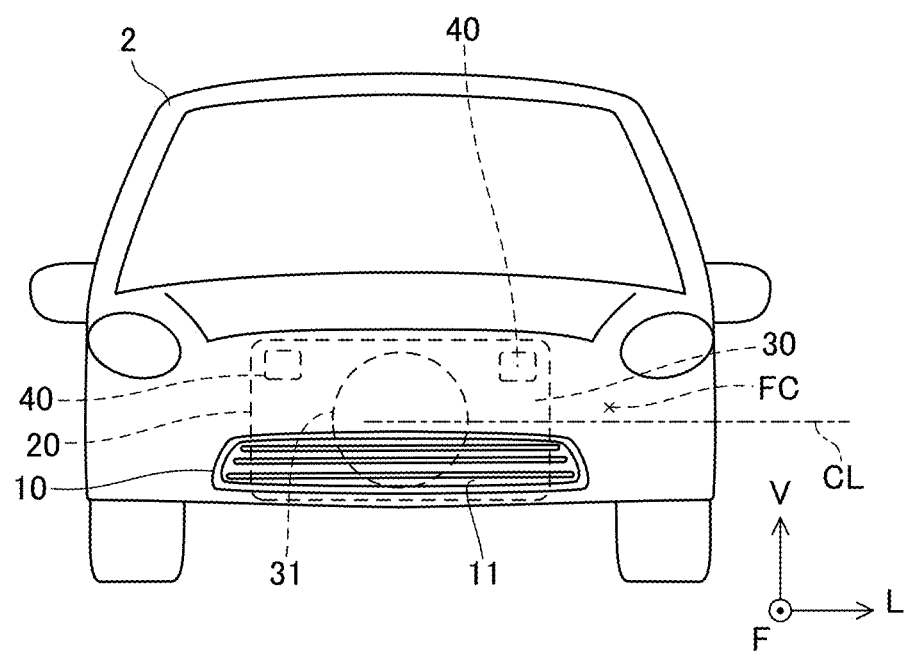
FIG. 2 is a front view of the vehicle according to the embodiment.

With reference to the drawings, a vehicle 2 according to an embodiment will be described. FIG. 1 shows a perspective view of a front part of the vehicle 2. FIG. 2 shows a front view of the vehicle 2. In the coordinate system in FIG. 1, "F" indicates a front direction of the vehicle, "V" indicates an up direction of the vehicle, and "L" indicates "left" when the vehicle is seen from its rear to front. In the other drawings as well, the meanings of "F", "V", and "L" in the coordinate system are the same.

The vehicle 2 includes a front grille 10, and the front grille 10 includes an air intake 11. FIG. 1 does not show a louver disposed at the air intake 11. FIG. 1 shows, by dashed lines, a bumper (bumper reinforcement) 3, an air duct 20, a radiator 30, and horns 40 that are arranged in a front compartment FC. The radiator 30 is arranged behind the bumper 3. Arranged between the front grille 10 and the radiator 30 is the air duct 20 configured to guide air from the air intake 11 to the radiator 30.

In FIG. 2, a long dashed dotted line represents a center line CL of the radiator 30 in up-down direction. The air intake 11 of the vehicle 2 is located at a relatively low position, specifically below the center line CL of the radiator 30 in the up-down direction. The air duct 20 widens upward from the air intake 11 to the radiator 30 such that a front surface of a fan of the radiator 30 (radiator fan 31) is exposed to air taken in through the air intake 11.

The horns 40 are arranged in front of the air duct 20. In FIGS. 1 and 2, the horns 40 are depicted in a simplified manner. Although not shown, the horns 40 are supported by a frame configured to support the radiator 30 (e.g., a radiator support). The horns 40 are supported by a structure located in the front compartment FC.

As shown in FIG. 2, the horns 40 are arranged not to overlap with the radiator fan 31 when the vehicle 2 is seen from the front. Each of the horns 40 is arranged to overlap with corresponding one of upper corners of the air duct 20 when the vehicle 2 is seen from the front.

Figure 3:
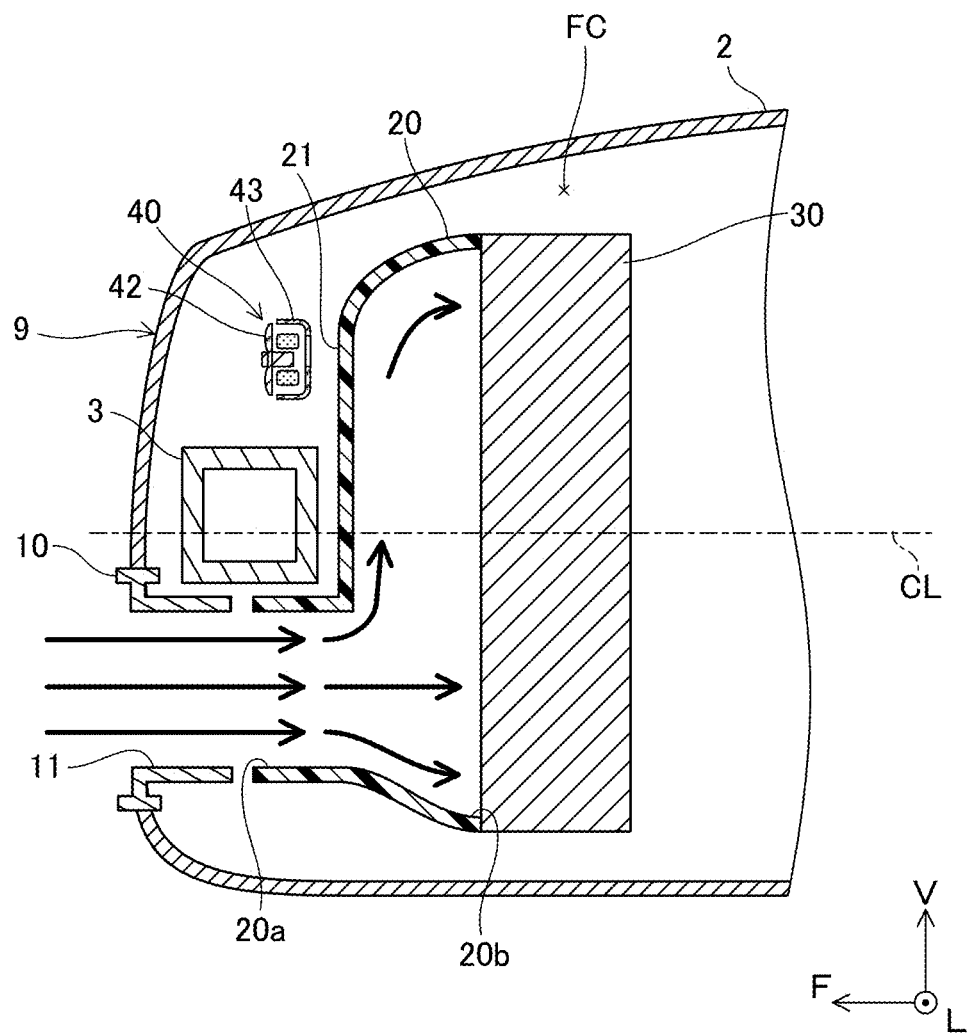
FIG. 3 is a cross-sectional view of the vehicle according to the embodiment.

One of the horns 40 will be explained hereinafter. FIG. 3 shows a cross-sectional view of a front part 9 of the vehicle 2. The cross section of FIG. 3 is obtained by cutting the vehicle 2 along a plane intersecting the horn 40 and parallel to the F-axis and the V-axis in the coordinate system in the drawing. Although not shown, the horn 40 is supported by the radiator support. FIG. 3 does not show the structure of the radiator 30.

Bold arrows in FIG. 3 indicate flows of air. The air flowing in through the air intake 11 enters the air duct 20 from a front inlet 20a and exits from a rear outlet 20b. As described above, the air intake 11 of the front grille 10 is located lower than the center line CL of the radiator 30 in the up-down direction. The inlet 20a of the air duct 20 is also located lower than the center line CL of the radiator 30. The outlet 20b widens upward beyond the center line CL of the radiator 30 in the up-down direction such that the outlet 20b covers the entirety of a front surface of the radiator 30. The air duct 20 widens upward from the front toward the rear of the vehicle when seen from a lateral side of the vehicle.

An upper part 21 of the air duct 20 has a flat surface, and the horn 40 is located in front of the flat upper part 21 of the air duct 20. When a switch (not shown) of the horn 40 is turned on, diaphragm 42 vibrate and a sound is thereby emitted. The horn 40 is attached to a body of the vehicle 2 with the diaphragm 42 oriented forward and case 43 located behind the diaphragm 42. Each of the case 43 of the horn 40 includes a hole at its rear part, such that the sound leaks rearward.

The air duct 20 is constituted of a relatively soft resin. The sound leaking rearward from the horn 40 cause the upper part 21 of the air duct 20 to vibrate. The air duct 20 serves as a sounding board and reflects the sound from the horn 40 forward. The sound leaking rearward from the horn 40 is reflected at the air duct 20 and spreads out forward. As shown in FIG. 3, the front part 9 of the vehicle 2 is closed in front of the horn 40, such that the sound from the horn 40 is less likely to be emitted to the outside. However, since the air duct 20 serves as a sounding board and reflects the sound from the horn 40 forward, the sound from the horn 40 is effectively emitted forward from the vehicle 2.

The case 43 of the horn 40 in FIG. 3 includes a hole, but the case may not necessarily include a hole.

Figure 4:
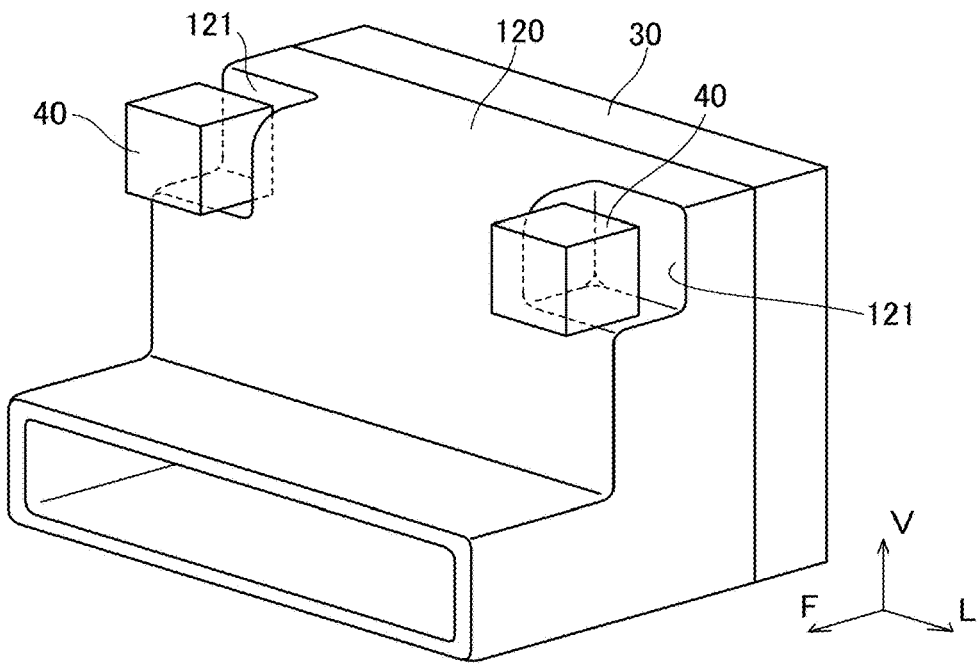
FIG. 4 is a perspective view of an air duct according to a first variant.
Figure 5:
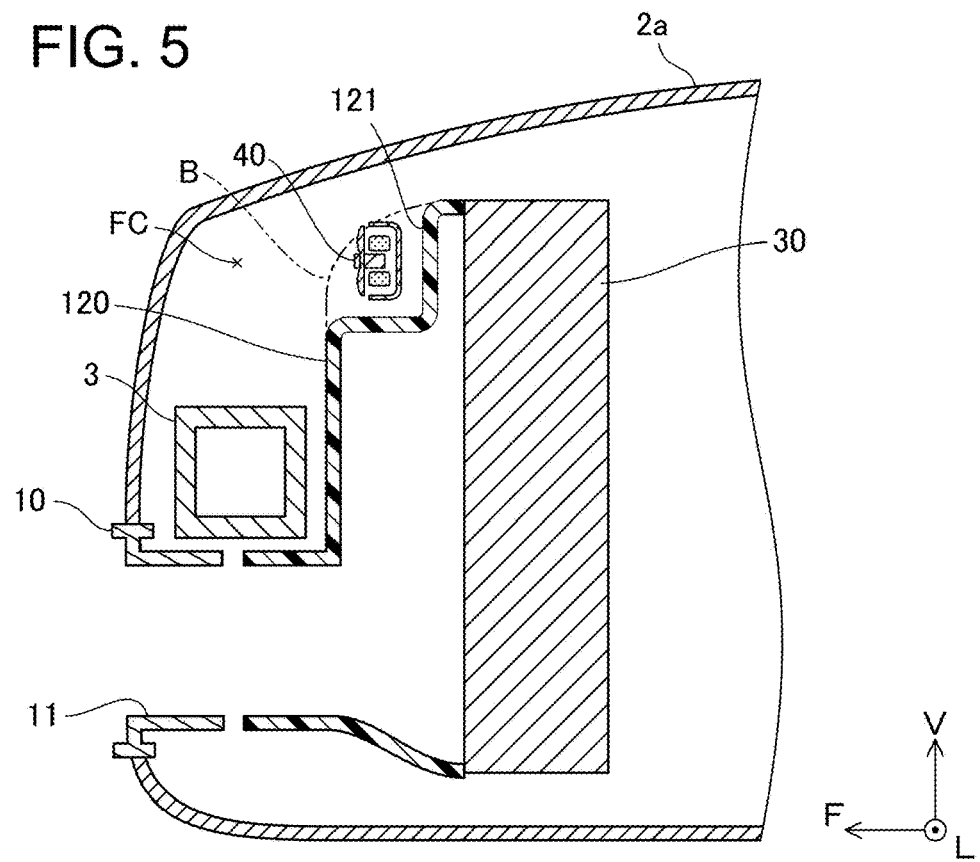
FIG. 5 is a cross-sectional view of a vehicle employing the air duct according to the first variant.

(First Variant) With reference to FIGS. 4 and 5, a vehicle 2a that adopts a variant of the air duct (air duct 120) will be described. FIG. 4 is a perspective view of the air duct 120, and FIG. 5 is a cross-sectional view of a front part of the vehicle 2a. FIG. 4 also shows horns 40 and a radiator 30. FIG. 4 depicts the horns 40 in a simplified manner.

The air duct 120 widens upward from a front toward a rear of the vehicle. The air duct 120 includes recesses 121 at upper corners of the air duct 120 when seen from the front. Each of the horns 40 is arranged at corresponding one of the recesses 121. A long dashed double-dotted line B in FIG. 5 indicates a contour of the upper corners of the air duct 20 in FIG. 3. As is understood in comparison with FIG. 3, the positions of the horns 40 are shifted rearward. Providing the recesses 121 at the upper corners of the air duct 120 and arranging the horns 40 at the recesses 121 enable effective use of a space of the front compartment FC. A front part of each horn 40 may partly protrude from the recess 121. The long dashed double-dotted line B also corresponds to a contour of a part of the air duct 120 between the right and left recesses 121.

As described above, the recesses 121 are provided at the upper corners of the air duct 120 when seen from the front of the vehicle. The upper corners do not overlap with a radiator fan 31 when seen from the front of the vehicle, thus the recesses 121 hardly affect an amount of air supplied to the radiator fan 31. Although not shown, the horns 40 are supported by a radiator support.

Figure 6:
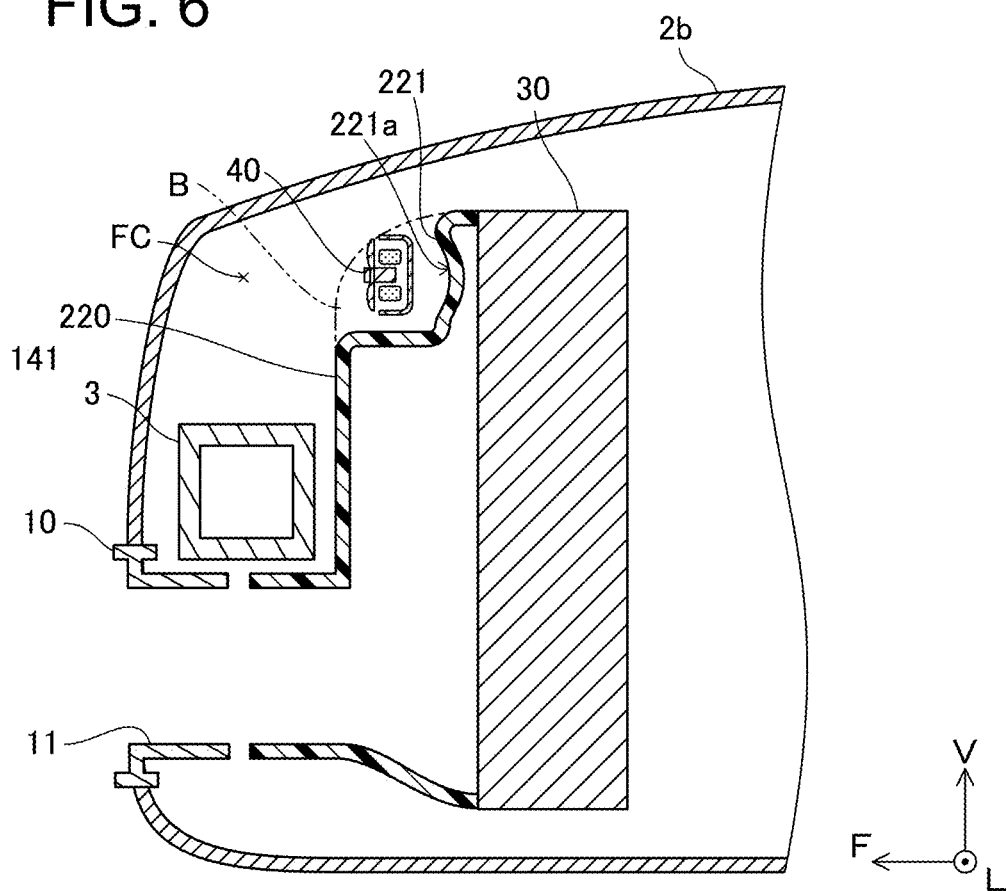
FIG. 6 is a cross-sectional view of a vehicle employing an air duct according to a second variant.

(Second Variant) FIG. 6 shows an air duct 220 of a second variant. FIG. 6 is a cross-sectional view of a front part of a vehicle 2b that adopts the air duct 220. Similar to the air duct 120 of the first variant, the air duct 220 includes recesses 221 at upper corners of the air duct 220 when seen from a front of the vehicle, and horns 40 are arranged at the recesses 221, respectively. As in FIG. 5, a long dashed double-dotted line B in FIG. 6 corresponds to a contour of a prat of the air duct 220 between the right and left recesses 221.

Each recess 221 includes a bottom surface 221a (a part of the air duct 220 that faces the horn 40) that is curved to be recessed rearward. The sound from the horns 40 is effectively reflected forward by the curved parts of the air duct 220 that face the horns 40 (the bottom surfaces 221a). The bottom surfaces 221a (Surfaces of the air duct 220 that are behind the horns 40) may be paraboloidal surfaces.

Points to be noted relating to the art described in the embodiment will be listed. The vehicle according to the embodiment includes two horns 40, however, the vehicle may include a single horn. In the vehicle according to the embodiment, each of the horns is arranged at corresponding one of right and left upper corners of the air duct when the vehicle is seen from the front. However, a horn may be arranged only at either of the right upper corner or the left upper corner of the air duct when the vehicle is seen from the front. In this case, a recess may be provided at either of the right upper corner or the left upper corner of the air duct, and the horn may be arranged at the recess.

The art disclosed herein is suitable especially for a vehicle in which an air intake of its front grille is provided at a lower position on the front of the vehicle. The art disclosed herein, however, is not limited by the position and the size of the air intake.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle comprising:
    a front grille including an air intake;
    a radiator arranged behind the front grille;
    an air duct configured to guide air from the air intake to the radiator, the air duct widening upward from the air intake to the radiator; and
    a horn arranged out of the air duct and in front of the air duct at a position higher than the air intake.

2. The vehicle of claim 1, wherein the horn is arranged not to overlap with a fan of the radiator when seen from a front of the vehicle.

3. The vehicle of claim 1, wherein the horn is arranged to overlap with an upper corner of the air duct when seen from a front of the vehicle.

4. The vehicle of claim 1, wherein
    a recess is provided at an upper corner of the air duct, and the horn is arranged at the recess.

5. The vehicle of claim 1, wherein the air duct is recessed at a position behind the horn.

* * * * *